United States Patent
Cheng et al.

(10) Patent No.: US 8,321,742 B2
(45) Date of Patent: Nov. 27, 2012

(54) ADAPTIVE AUTOMATIC REPEAT-REQUEST APPARATUS AND METHOD FOR A MULTIPLE INPUT MULTIPLE OUTPUT SYSTEM

(75) Inventors: Ming-Hung Cheng, Taipei (TW); Ming-Chien Tseng, Kaohsiung (TW); Hsin-Piao Lin, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 721 days.

(21) Appl. No.: 12/541,875

(22) Filed: Aug. 14, 2009

(65) Prior Publication Data

US 2010/0262885 A1  Oct. 14, 2010

(30) Foreign Application Priority Data

Apr. 10, 2009 (TW) .............................. 98112017 A

(51) Int. Cl.
*H03M 13/00* (2006.01)
(52) U.S. Cl. ........................................ 714/749
(58) Field of Classification Search .......... 714/748–755, 714/758, 764, 774–776, 786, 795, 799
See application file for complete search history.

(56) References Cited

U.S. PATENT DOCUMENTS

| | | | | |
|---|---|---|---|---|
| 8,060,802 B2* | 11/2011 | Popovski et al. | ............. | 714/751 |
| 8,181,076 B2* | 5/2012 | Lou et al. | ...................... | 714/748 |
| 2004/0268206 A1* | 12/2004 | Kim et al. | ...................... | 714/758 |
| 2006/0107167 A1* | 5/2006 | Jeong et al. | .................... | 714/748 |
| 2007/0255993 A1* | 11/2007 | Yap et al. | ....................... | 714/748 |
| 2009/0245426 A1* | 10/2009 | Ratnakar et al. | ............. | 375/327 |
| 2010/0098185 A1* | 4/2010 | Miyazaki | ....................... | 375/267 |
| 2010/0180170 A1* | 7/2010 | Seo et al. | ....................... | 714/748 |

FOREIGN PATENT DOCUMENTS

| | | |
|---|---|---|
| CN | 101019360 A | 8/2007 |
| CN | 101039164 A | 9/2007 |
| EP | 1855408 A1 | 11/2007 |
| WO | 2007149047 A1 | 12/2007 |

OTHER PUBLICATIONS

Novel MIMO HARQ Schemes Jointly Utilizing Chase Combining, Yang Gao, Guangjie Li, Kuilin Chen, Hongming Zheng, Xiaoyun Wu,ICCT' 2006.
Taiwan Patent Office, Office Action, Patent Application Serial No. TW098112017, Sep. 28, 2012, Taiwan.
China Patent Office, Office Action, Patent Application Serial No. CN200910136070.9, Jul. 31, 2012, China.
K. Acolatse and Y. B. Ness, "An Alamouti-based Hybrid-ARQ Scheme for MIMO Systems," Samsung advanced Institute of Technology(SAIT), 2007.

* cited by examiner

*Primary Examiner* — Nadeem Iqbal
(74) *Attorney, Agent, or Firm* — Lin & Associates IP, Inc.

(57) ABSTRACT

The present invention relates to an adaptive automatic repeat-request apparatus and method for an MIMO system including a transmitter and a receiver. The apparatus comprises an adaptive retransmission component located at the transmitter. The adaptive retransmission component uses a special frame structure that divides the transmission data in a frame into several sections according to the number of transmission antennas, and adds an individual error detecting code within each section. The transmission data are sent to the receiver through the several antennas. The receiver responds to the adaptive retransmission component with feedback information of an acknowledgement or negative acknowledgement signal, and detected signal strength of data for each transmission antenna. After receiving the signal strength of transmission data, the retransmission signal vector for error data is determined.

20 Claims, 11 Drawing Sheets

| RETRANSMISSION INDEX | 0 | 1 | 2 | 3 |
|---|---|---|---|---|
| SYMBOL VECTOR | $\begin{bmatrix} S1 \\ S2 \\ S3 \\ S4 \end{bmatrix}$ | $\begin{bmatrix} S4 \\ S1 \\ S2 \\ S3 \end{bmatrix}$ | $\begin{bmatrix} S3 \\ S4 \\ S1 \\ S2 \end{bmatrix}$ | $\begin{bmatrix} S2 \\ S3 \\ S4 \\ S1 \end{bmatrix}$ |

FIG. 3 (PRIOR ART)

| RETRANSMISSION INDEX | 0 | 1 | 2 | 3 |
|---|---|---|---|---|
| SYMBOL VECTOR | $\begin{bmatrix} S1 \\ S2 \\ S3 \\ S4 \end{bmatrix}$ | $\begin{bmatrix} -S4^* \\ S3^* \\ -S2^* \\ S1^* \end{bmatrix}$ | $\begin{bmatrix} -S2 \\ S1 \\ S4 \\ -S3 \end{bmatrix}$ | $\begin{bmatrix} -S3^* \\ S4^* \\ -S1^* \\ S2^* \end{bmatrix}$ |

FIG. 4 (PRIOR ART)

| NO. OF ERROR SYMBOLS | 1 | <= N/2 | > N/2 |
|---|---|---|---|
| ADAPTIVE RETRANSMISSION METHOD | ALL ANTENNAS RETRANSMIT ERROR SYMBOLS | ANTENNAS ARE USED TO RETRANSMIT ERROR SYMBOLS UNIFORMLY | EACH ANTENNA RETRANSMITS AN ERROR SYMBOL + SELECT THE WEAKEST SYMBOL TO DUPLICARE RETRANSMISSION BY OTHER ANTENNAS |

FIG. 6

| NO. OF ERROR SYMBOLS | 1 | 2 | 3 |
|---|---|---|---|
| ERROR SYMBOL | S1 | S1 AND S2 | S2, S3 AND S4 |
| SYMBOL VECTOR | $\begin{bmatrix} -S1^* \\ S1^* \\ -S1^* \\ S1^* \end{bmatrix}$ | $\begin{bmatrix} -S2^* \\ S1^* \\ -S2^* \\ S1^* \end{bmatrix}$ OR $\begin{bmatrix} -S1^* \\ S2^* \\ -S2^* \\ S1^* \end{bmatrix}$ | $\begin{bmatrix} -S4^* \\ S3^* \\ -S2^* \\ S3^* \end{bmatrix}$ OR $\begin{bmatrix} -S4^* \\ S3^* \\ -S2^* \\ S2^* \end{bmatrix}$ OR $\begin{bmatrix} -S4^* \\ S3^* \\ -S2^* \\ S4^* \end{bmatrix}$ |

FIG. 7

ADAPTIVE AUTOMATIC REPEAT-REQUEST APPARATUS AND METHOD FOR A MULTIPLE INPUT MULTIPLE OUTPUT SYSTEM

TECHNICAL FIELD

The present invention generally relates to an adaptive automatic repeat-request apparatus and method for a multiple input multiple output (MIMO) system.

BACKGROUND

The improvement of system transmission efficiency and throughput is an important issue for a communication system. A plurality of wireless connection technologies are used to improve the system transmission efficiency and throughput, such as the automatic repeat-request mechanism of Orthogonal Frequency Division Multiplexing (OFDM) system, Multiple Input Multiple Output (MIMO) system and hybrid system, where OFDM system may be against the situation of frequency selective fading channel, MIMO system may effectively increase the system efficiency and throughput, and the automatic repeat-request (ARQ) or hybrid ARQ (HARD) mechanism may provide reliably data communication on the wireless link. Hence, using the advantages of the three systems to improve the conventional communication quality is the trend for various wireless communication protocols.

In the automatic repeat-request mechanism of the conventional hybrid system, as shown in the frame format with frame type of FIG. 1, the transmission data is not distinguished into different sections for individual antennas at the transmitter. Instead, a cyclic redundancy check (CRC) 110*a* is added to the end of data 110*b* in a fixed-L-length frame 110. When applied to a multi-antenna transmission system, if error occurs in one data section transmitted from one antenna, the entire data frame must be retransmitted again. Because it must retransmit entire data, the throughput will be reduced in communication.

U.S. Patent Publication No. 2007/0255993 disclosed an Automatic Repeat-reQuest (ARQ) control system of an OFDM-MIMO communication system. The control system provides four retransmission modes for feedback information, and selects a retransmission mode to retransmit data via a retransmission mode selecting section 210*a* of transmitter 210. Wherein two retransmission modes transmit the data with added new data, and the other two retransmission modes in which one is to use space-time block coding (STBC) with two antennas and another is to use four antennas to transmit the data after STBC. Therefore, receiver 220 needs to use two corresponding spatial decoding techniques which are Vertical Bell Laboratories Layer Space Time (VBLAST) and STBC, shown as decoder 220*a*.

Retransmission is required when error occurs during data transmission. At the transmitter, there are two ways to retransmit data. One way is permutation and interleaving retransmission (PIR) method. In other words, the permutation order of the antennas of the original data transmission will be changed in data retransmission, and interleaved in the time domain. The other way is the conjugating transformation retransmission (CTR) method. In other words, not only the antenna permutation order is changed in data retransmission, but the signals are used of complex conjugate and re-permutated.

Take N=4 as an example. Both transmitter and the receiver have four antennas. The data transmitted by each antenna uses, for example, OFDM symbol, as a unit. The four antennas transmit corresponding symbols S1-S4. FIG. 3 shows an example for the PIR method of four transmission antennas. For each data retransmission, the symbol vector transmitted by four antennas will change the original antenna permutation, and the symbols of each retransmission symbol vector will also interleave with the same order. FIG. 4 shows an example for the CTR method. For each retransmission, not only the symbol vector transmitted by the four antennas is re-permutated in accordance with the antenna order, but the signals are used of complex conjugate and re-permutated. S1*, S2*, S3* and S4* of symbol vector are the complex conjugate of symbols S1, S2, S3 and S4.

In addition to the frame type of FIG. 1, another frame type is shown as FIG. 5. In the example of FIG. 5, each fixed-L-length frame contains N transmission data sections. Individual error detection code I is added to the end of each transmission data section I, where $1 \leq I \leq N$, N is an integer greater than 1.

SUMMARY

The disclosed exemplary embodiments of the present invention may provide an adaptive automatic repeat-request apparatus and method for a multiple input multiple output system.

In an exemplary embodiment, the disclosed relates to an adaptive automatic repeat-request apparatus for a multiple input multiple output (MIMO) system including a transmitter and a receiver. The adaptive automatic repeat-request apparatus comprises an adaptive retransmission component located at the transmitter. The adaptive retransmission component has a special frame structure that divides the transmission data in a frame into several sections according to the number of several different antennas, and adds an individual error detecting code within each section. The transmission data are sent to the receiver through the several antennas. The receiver responds to the adaptive retransmission component with feedback information of an acknowledgement (ACK) signal or a negative acknowledgement (NACK) signal for each antenna, and the received signal strength (RSS) of transmission data for each antenna. The adaptive automatic repeat-request apparatus collects the feedback information, and determines at least a retransmission signal vector for error data.

In another exemplary embodiment, the disclosed relates to an adaptive automatic repeat-request method for a multiple input multiple output (MIMO) system including a transmitter and a receiver. The adaptive automatic repeat-request method receives an ACK or at least one NACK signal from a receiver via an adaptive retransmission component located at the transmitter, and determines whether a transmission antenna of a plurality of transmission antennas has transmitted data incorrectly. If the ACK signal is received, a data section transmitted by said transmission antenna is correct and no retransmission is required. If the at least a NACK signal is received, the data section transmitted by said transmission antenna is not properly received and retransmission is required. At least an error data section in an error frame is selected for duplicated retransmission by all or other transmission antennas of said plurality of transmission antennas.

The foregoing and other features, aspects and advantages of the present invention will become better understood from a careful reading of a detailed description provided herein below with appropriate reference to the accompanying drawings.

BRIEF DESCRIPTION OF THE DRAWINGS

FIG. 3 shows an exemplary schematic view illustrating the PIR method for data retransmission at a transmitter.

FIG. 4 shows a schematic view illustrating the CTR method for data retransmission at a transmitter.

FIG. 6 shows an exemplary schematic view illustrating an adaptive automatic repeat-request method, consistent with certain disclosed embodiments of the present invention.

FIG. 7 shows an exemplary schematic view illustrating the placement of retransmission symbols when 1-3 error symbols occurred by using four antennas for transmitting and receiving data, consistent with certain disclosed embodiments of the present invention.

DETAILED DESCRIPTION OF THE PREFERRED EMBODIMENTS

In the exemplary embodiments of the present invention, the disclosed may provide a kind of automatic repeat-request technology applicable to MIMO systems. The retransmission technology divides the data into a plurality of sections according to the number of transmission antennas and adds individual error detecting code in each section. The data sections are transmitted by different antennas. In this manner, the receiver may find out reception error occurs in which data section by the individual error detecting code, and retransmits the same data section from one or more other antennas.

Figure 1:
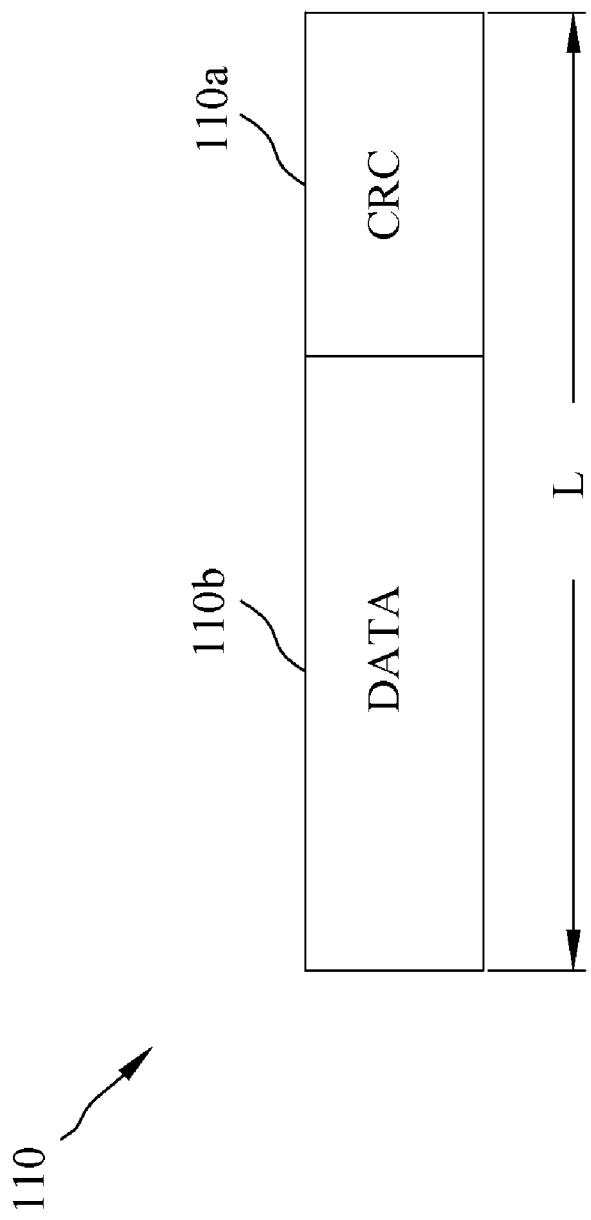
FIG. 1 shows an exemplary schematic view of a frame type of conventional hybrid automatic retransmission request mechanism.
Figure 2:
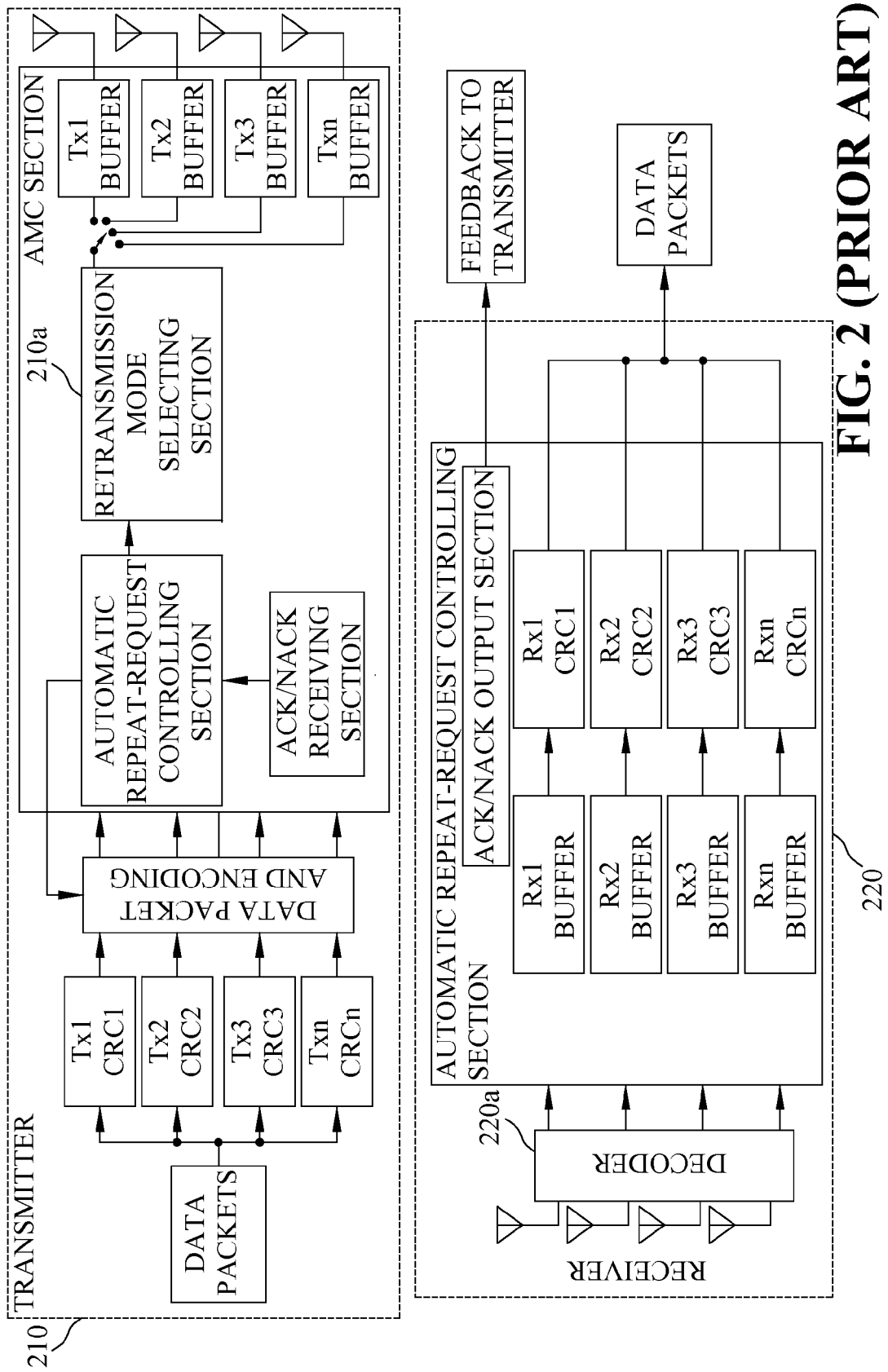
FIG. 2 shows an exemplary schematic view of a conventional automatic retransmission request control system for a multiple input multiple output (MIMO) system.
Figure 5:
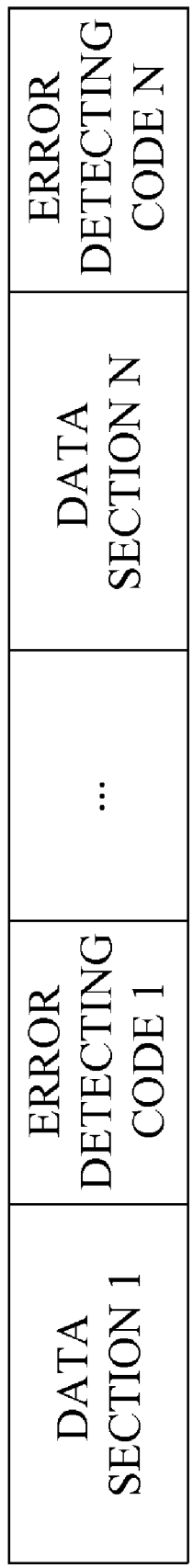
FIG. 5 shows an exemplary schematic view of another conventional frame type of an MIMO system.

Therefore, the frame structure shown in FIG. 5 may be used for the data transmitted by antennas in the exemplary embodiments. Assume that different data sections are transmitted from different antennas, marked as data section 1 to data section N, where N is the number of transmission and receiving antennas. Accordingly, in a frame, the individual error detecting code I is added to the end of each data section I, where $1 \leq I \leq N$. Error detecting code I may be CRC code (CRC_I) or another kinds of error detecting code.

Besides adding individual error detecting code for each data section, the exemplary embodiments also include antenna selection and retransmission data processing function, called adaptive retransmission section. For simplicity of explanation, one OFDM symbol is transmitted by one antenna. Antenna selection is to arrange retransmission signal vector.

For example, when the number of error symbols is a constant integer, such as 1, 2, or other constant, all the antennas must retransmit one of the error symbols. In the example of FIG. 6, the constant integer is 1. When the ratio of the number of error symbols to the number of transmission antennas is less than or equal to a threshold, such as, ½, ⅔ or other values, one of the error symbols is duplicated and retransmitted by a plurality of antennas. It is to use all antennas to duplicate retransmission for error symbols uniformly. In the example of FIG. 6, the threshold is ½. In other words, the number of error symbols is less than or equal to half of the number of transmission antennas (i.e. N/2). When the ratio of the number of the error symbols to the number of transmission antennas is greater than the threshold, an antenna transmits an error symbol. Because each error symbol cannot be duplicated retransmission on other antennas at the same time, it is necessary to select some error symbols for duplication. In the example of FIG. 6, when the number of the error symbols exceeds the half of the number of antennas, the adaptive retransmission method is to select weakest signal strength of error symbols and duplicate retransmission by other transmission antennas at the same time.

The receiver will respond with the receiving signal strength of the transmission data so that the transmitter knows the signal strength of the transmission data for each antenna.

Following the retransmission of FIG. 6, FIG. 7 shows a working example of CTR for analysis, consistent with certain disclosed embodiments of the present invention. Wherein, assume that the transmitter uses four antennas for transmitting and receiving data. The example shows the placement of retransmitted symbols in the symbol vector at the first time retransmission when 1-3 error symbols occur in transmission. When retransmission happens, the correct symbols are not retransmitted, and the vacancies in the symbol vector are filled with error symbols repeatedly so that the error symbols will have duplicated retransmission by other antennas.

In the example of FIG. 7, when the number of error symbols is 1 (e.g., error symbol is S1), the four antennas use the CTR method to retransmit S1, i.e., the placement of retransmission symbol vector is −S1*, S1*, −S1*, S1*. When the number of error symbols is 2 (e.g., error symbols are S1 and S2), the four antennas are uniformly used to retransmit the error symbols S1 and S2 in the CTR method. In this manner, the placement of error symbols by these four antennas may have the retransmission symbol vector −S2*, S1*, −S2*, S1*, or −S1*, S2*, −S2*, S1*. When the number of error symbols is 3, it must select one of the three error symbols to duplicate retransmission by other antenna. The selection method may be based on the distribution order of signal strength of each antenna replied from the receiver, or other information indicating the signal strength to determine which error symbols must be selected for duplicated retransmission.

When the number of error symbols is 3 (e.g., error symbols are S2, S3 and S4), there are three different ways to place the error symbols for four antennas. The first retransmission symbol vector is −S4*, S3*, −S2*, S3*; the second is −S4*, S3*, −S2*, S2*; and the third is −S4*, S3*, −S2*, S4*.

Figure 8:
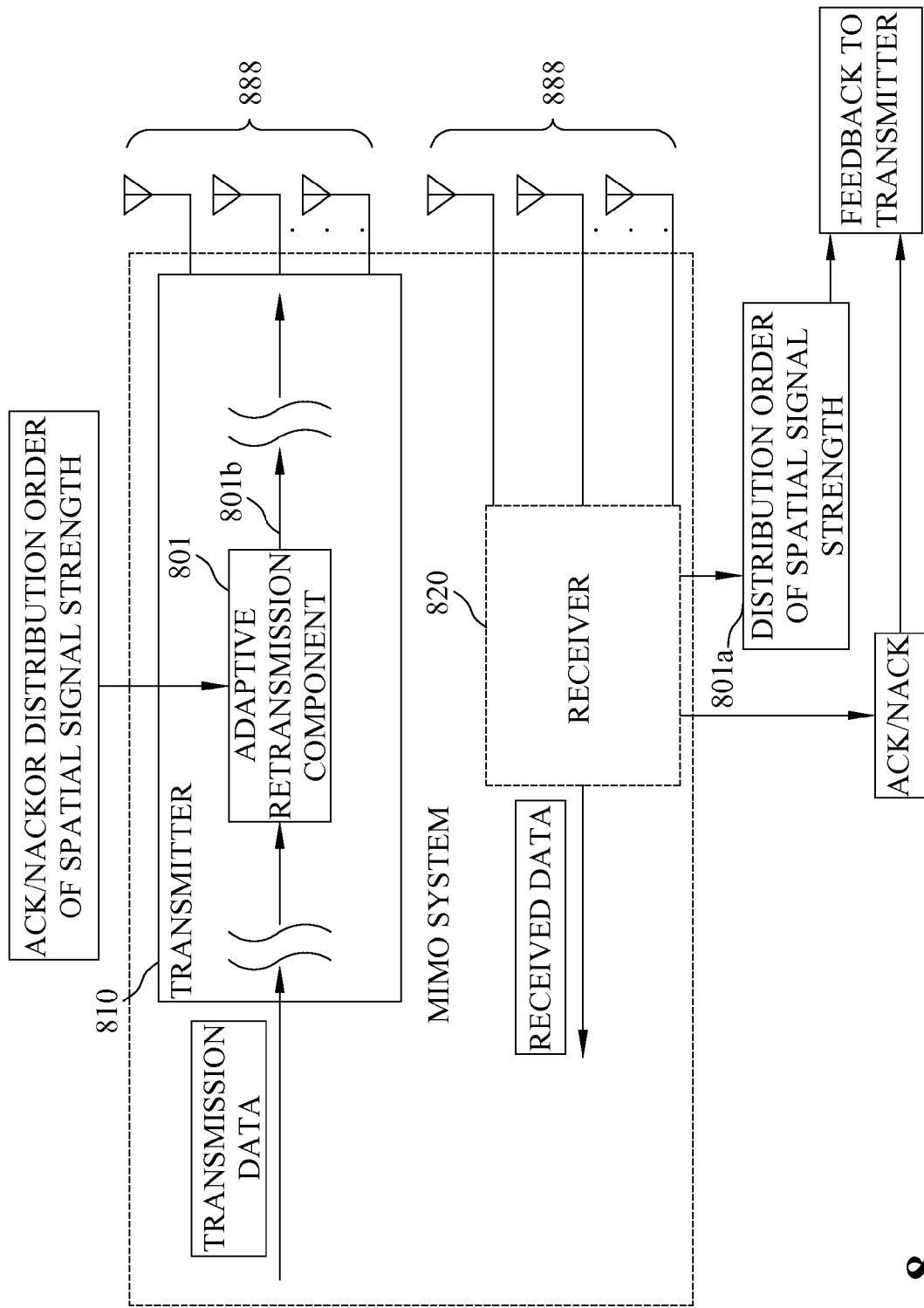
FIG. 8 shows an exemplary schematic view illustrating an adaptive automatic repeat-request apparatus for an MIMO system, consistent with certain disclosed embodiments of the present invention.

Accordingly, FIG. 8 shows an exemplary embodiment of an adaptive automatic repeat-request apparatus for an MIMO system to accomplish the adaptive automatic repeat-request mechanism described above. In the FIG. 8, the adaptive automatic repeat-request apparatus includes an adaptive retransmission component 801, which may use a frame structure as shown in FIG. 5. The adaptive automatic repeat-request apparatus is applicable to an MIMO system including a transmitter 810 and a receiver 820. Adaptive retransmission component 801 is located at transmitter 810, and there are multiple antennas 888 for transmitting data to receiver 820, wherein the frame structure used by adaptive retransmission component 801 is showed in FIG. 5. For transmitted data from each antenna, receiver 820 responds with an acknowledgement signal ACK or negative acknowledgement signal NACK to adaptive retransmission component 801, and feedbacks the signal strength of transmission data from multiple antennas 888 to adaptive retransmission component 801. Adaptive retransmission component 801 collects the signal strength information in the feedback data, such as, distribution order of spatial signal strength 801a, and determines at least a retransmission signal vector 801b of error data.

In the exemplary embodiment of FIG. 8, adaptive retransmission component 801 may determine the retransmission signal vector of the error data based on such as any combination of three types of information including the estimated signal-to-noise ratio (SNR), channel fading condition, and the distribution order of received spatial signal strength for different antennas.

Figure 9A:
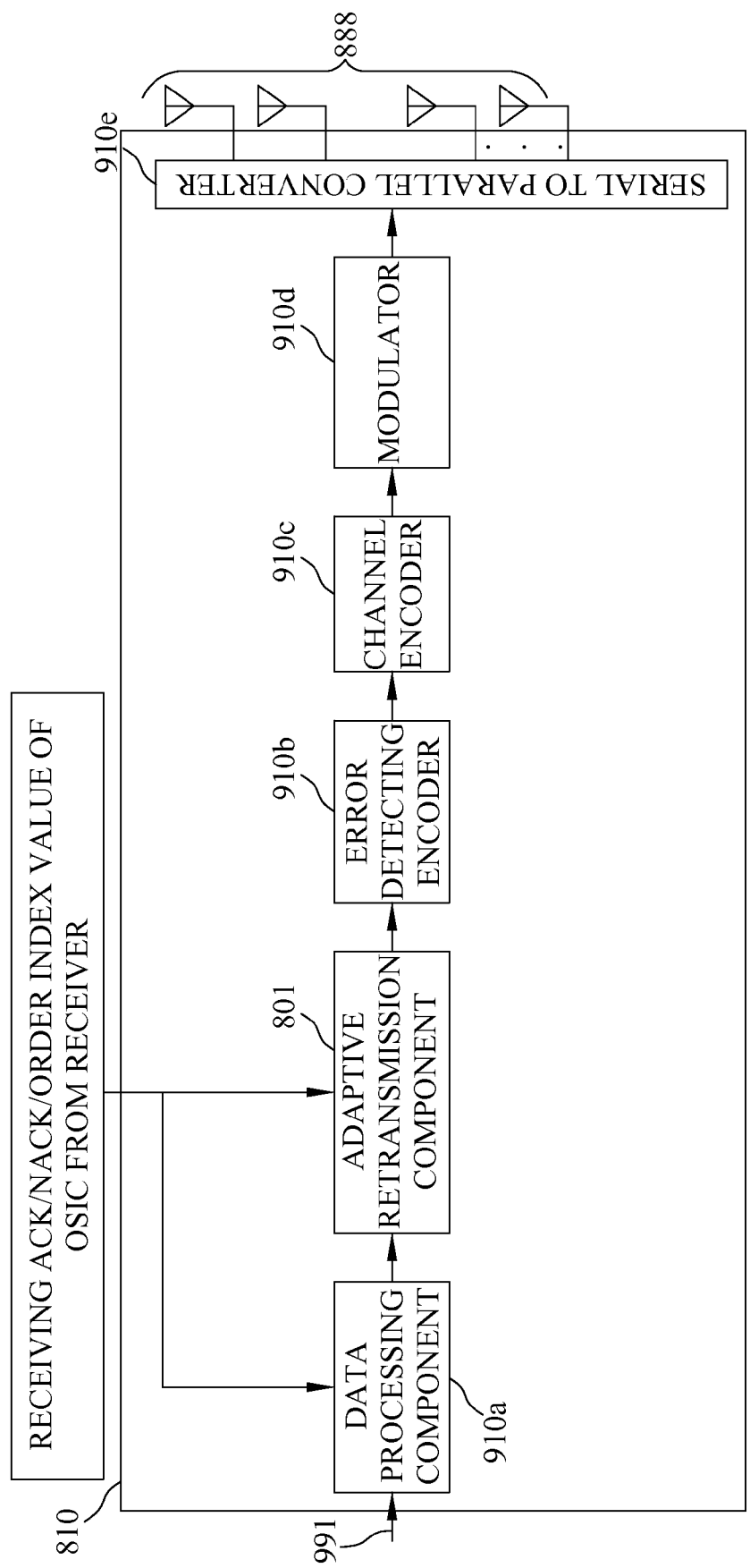
FIG. 9A shows an exemplary schematic view of the transmitter of an MIMO system including an adaptive ARQ apparatus, consistent with certain disclosed embodiments of the present invention.

As shown in the embodiment of FIG. 9A, adaptive retransmission component 801 receives a feedback ACK/NACK signal from receiver 820 or distribution order of spatial signal strength, such as, the order index value of ordering successive interference cancellation (OSIC). Transmitter 810 further includes a data processing component 910a, an error detecting encoder 910b, a channel encoder 910c a modulator 910d and a serial parallel converter 910e. Adaptive retransmission component 801 may be placed between data processing component 910a and error detecting encoder 910b. The adaptive ARQ transmission apparatus of FIG. 8 may further include data processing component 910a to process received information packet 991 and transmit to the adaptive retransmission component. Error detecting encoder 910b may be, such as, CRC encoder or other data error detecting encoders.

The adaptive automatic repeat-request apparatus of the present invention may include an adaptive retransmission component 801 and an error detecting encoder. The error detecting encoder may encode new data and retransmission data forwarded by adaptive retransmission component 801. Adaptive retransmission component 801 processes the retransmission signal vector of error data and then retransmission data is encoded by the error detecting encoder.

Figure 9B:
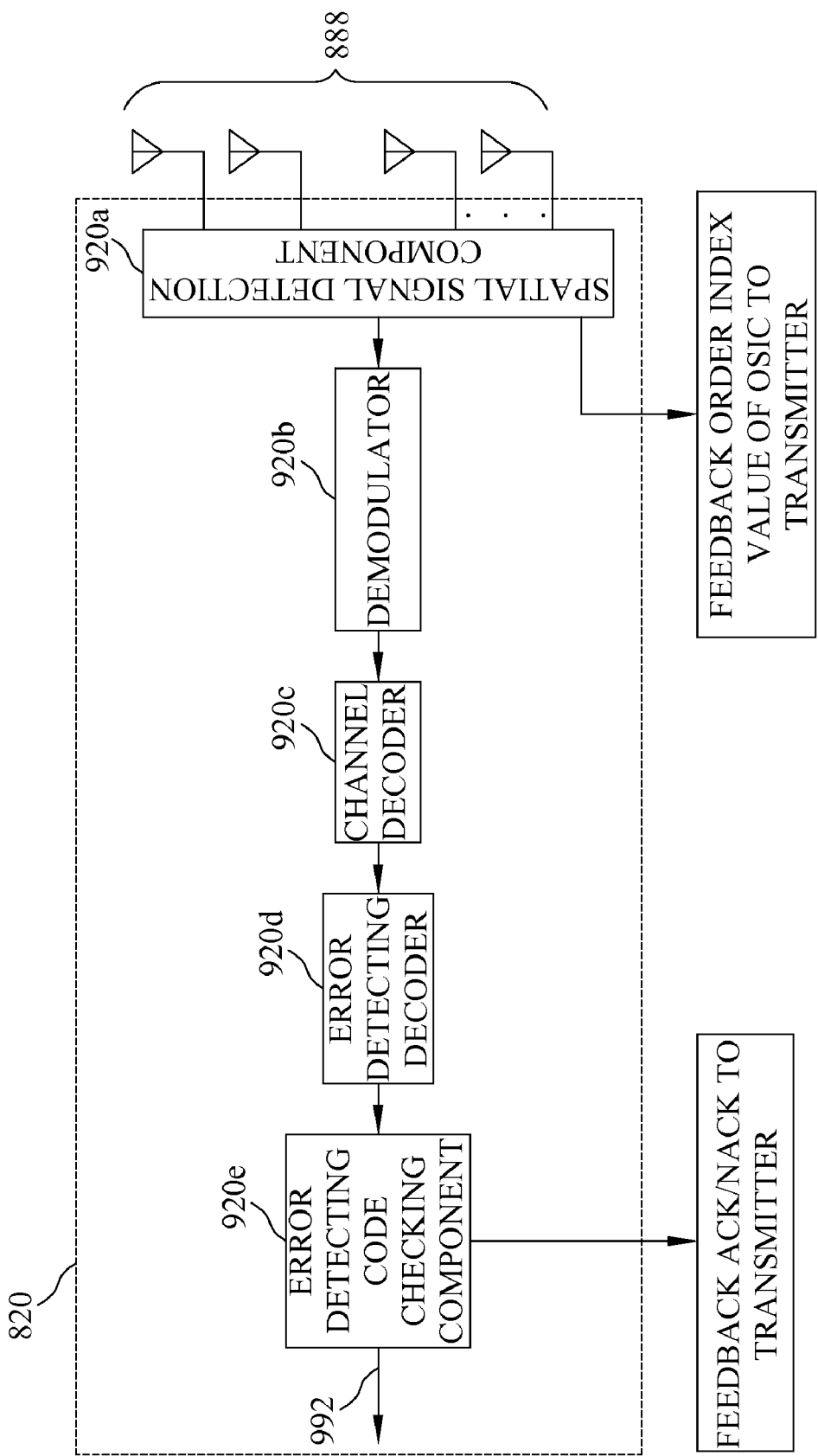
FIG. 9B shows an exemplary schematic view of the receiver of an MIMO system including an adaptive ARQ apparatus, consistent with certain disclosed embodiments of the present invention.

As shown in FIG. 9B, receiver 820 may generate received packet 992 via, such as, a spatial signal detection component 920a with multiple antennas, demodulator 920b, a channel decoder 920c, an error detecting decoder 920d, and an error detecting code checking component 920e of each transmitted data section. Spatial signal detection component 920a responses with the spatial signal strength of receiving data from multiple antennas 888 to adaptive retransmission component 801 at the transmitter 810. For example, the distribution order of spatial signal strength 801a is an order index value of OSIC. Error detecting decoder 920d may be, such as, CRC decoder or other data error detecting decoders.

If the unit of the data transmitted by each antenna is OFDM symbol, modulator 910d of transmitter 810 and demodulator 920b of receiver 820 may be realized with an OFDM modulator and an OFDM demodulator respectively.

According to the error detecting code, receiver 820 may find out which data section of the transmission antennas contains an error at the receiver. Therefore, in addition to the feedback signal, such as distribution order of spatial signal strength 801a, transmitted by spatial signal detection component 920a of receiver 820, adaptive retransmission component 801 will also receive the ACK or NACK signal responded by error detecting code checking component 920e of receiver 820. If adaptive retransmission component 801 receives an ACK signal from error detecting code checking component 920e regarding a certain transmitted data section, the data section will not be retransmitted together with other data sections. If adaptive retransmission component 801 receives a NACK signal from error detecting code checking component 920e regarding a certain transmitted data section, the data section will be identified and will be retransmitted using the method depicted in FIG. 6.

Figure 10:
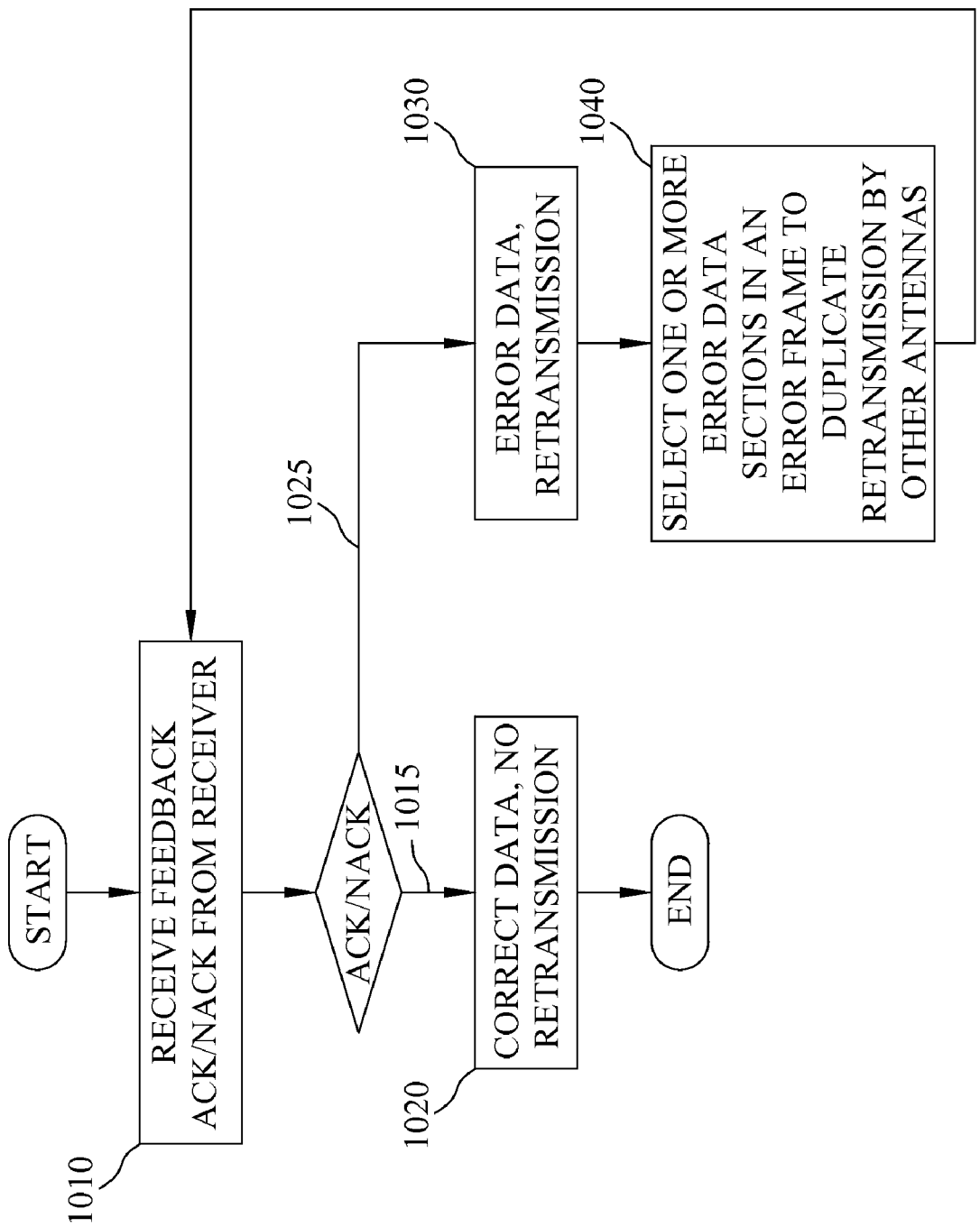
FIG. 10 shows an exemplary flowchart illustrating the adaptive automatic repeat-request method for an MIMO system, consistent with certain disclosed embodiments of the present invention.

Following the above description, FIG. 10 further shows the adaptive automatic repeat-request method for an MIMO system, consistent with certain disclosed embodiments of the present invention. In the exemplary flowchart shown in FIG. 10, at first, it is to receive through the adaptive retransmission component of transmitter an ACK/NACK signal responded by the receiver (step 1010) to know which data section of the transmission antennas contains error at the receiver. If an ACK signal is received (step 1015), the data section will not be retransmitted, as shown in step 1020. If a data section transmitted by transmission antenna was not properly received at receiver, it is called "error" data section and the transmitter needs to retransmit the error data section. Therefore, if a NACK signal is received (step 1025), the error data section will be retransmitted (step 1030) by all antennas. If two or more NACK signals are received, one or more error data sections in an error frame are selected for and duplicated retransmission by other antennas (step 1040). Then return to step 1010. The other antennas may be the antennas that transmitted data correctly at the previous transmission.

During retransmission, if the channel condition does not vary, the error data sections for retransmission may refer to the receiving signal strength, SNR, channel fading or order index value of received OSCI, or any of the above combination. The example of FIG. 6 shows that the symbol with the weakest signal strength of the three error symbols is selected for retransmission repeatedly from other antennas.

Because the retransmission mechanism in the adaptive automatic repeat-request apparatus and method of the present invention only retransmits error data, the receiver may use the same structure without changing, and no two types of spatial decoding techniques are required. Therefore, the present invention allows MIMO system to have extra spatial diversity gain, as well as to reduce the number of retransmission to improve the transmission efficiency for MIMO systems.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An adaptive automatic repeat-request apparatus for a multiple input multiple output (MIMO) system, said MIMO system including a transmitter and a receiver, said apparatus comprising:

an adaptive retransmission component located at said transmitter, including a special frame structure in which transmission data in a frame is divided into a plurality of data sections according to the number of a plurality of transmission antennas, and an individual error detecting code is added to the end of each data section, said transmission data being sent to said receiver through said plurality of transmission antennas;

wherein said receiver feeds back an acknowledgement (ACK) or at least one negative acknowledgement (NACK) to said adaptive retransmission component, said adaptive retransmission component determines that a data section transmitted by one of said plurality of transmission antenna is properly received at said receiver and no retransmission is required if said ACK signal is received, and said data section transmitted is not properly received at said receiver if said at least one NACK signal is received, and retransmitting at least an error data section in an error frame with duplicated retransmission by all or other transmission antennas of said plurality of transmission antennas; and wherein said adaptive retransmission component determines at least a retransmission signal vector for error data according to feedback information from said receiver about a distribution order of spatial signal strength for said plurality of transmission antennas, and if two or more NACK signals are received, said at least an error data section with weakest spatial signal strength is selected for duplicated retransmission by other transmission antennas that have transmitted data correctly in previous transmission.

2. The apparatus as claimed in claim 1, wherein if one NACK signal is received, said at least an error data section in said error frame is transmitted with duplicated retransmission by all of said plurality of transmission antennas.

3. The apparatus as claimed in claim 1, wherein said adaptive retransmission component determines said at least a retransmission signal vector of error data according to an adaptive retransmission method.

4. The apparatus as claimed in claim 1, wherein each of said plurality of data sections of said plurality of transmission antennas is identified with an orthogonal frequency division multiplexing (OFDM) symbol as a unit.

5. The apparatus as claimed in claim 1, wherein said adaptive retransmission component is placed between a data processing component and an error detecting encoder at said transmitter.

6. The apparatus as claimed in claim 1, said apparatus further includes a data processing component for processing one or more packets and transmitting the one or more packets to said adaptive retransmission component.

7. The apparatus as claimed in claim 1, said apparatus further includes an error detecting encoder for encoding new data and retransmission data forwarded by said adaptive retransmission component.

8. The apparatus as claimed in claim 1, wherein said individual error detecting code within each data section is a cyclic redundancy check code (CRC).

9. The apparatus as claimed in claim 1, wherein said adaptive retransmission component determines said at least a retransmission signal vector of error data by referring to any combination of a signal-to-noise ratio of error data, a channel fading condition, and said distribution order of spatial signal strength in the feedback information for said plurality of transmission antennas.

10. The apparatus as claimed in claim 5, wherein said error detecting encoder is a CRC encoder.

11. The apparatus as claimed in claim 9, wherein said distribution order of spatial signal strength in the feedback information is an order index value of ordering successive interference cancellation.

12. An adaptive automatic repeat-request method for a multiple input multiple output (MIMO) system, said MIMO system including a transmitter and a receiver, said method comprising:

receiving an acknowledgement (ACK) signal or at least one negative acknowledgement (NACK) signal from the receiver via an adaptive retransmission component located at the transmitter, to determine whether a transmission antenna of a plurality of transmission antennas has transmitted data incorrectly;

concluding that a data section transmitted by the transmission antenna is properly received at the receiver and no retransmission is required if said ACK signal is received; or concluding that said data section transmitted by the transmission antenna is not properly received at the receiver if said at least one NACK signal is received, and retransmitting at least an error data section in an error frame with duplicated retransmission by all or other transmission antennas of said plurality of transmission antennas;

wherein at least a retransmission signal vector for error data is determined according to feedback information from the receiver about a distribution order of spatial signal strength for said plurality of transmission antennas, and if two or more NACK signals are received, said at least an error data section with weakest spatial signal strength is selected for duplicated retransmission by other transmission antennas that have transmitted data correctly in previous transmission.

13. The method as claimed in claim 12, wherein if one NACK signal is received, said at least an error data section in said error frame is transmitted with duplicated retransmission by all of said plurality of transmission antennas.

14. The method as claimed in claim 12, wherein said adaptive retransmission component uses a special frame structure in which transmission data in a frame is divided into a plurality of data sections according to the number of said plurality of transmission antennas, and an individual error detecting code is added to the end of each of said plurality of data sections.

15. An adaptive automatic repeat-request method for a multiple input multiple output (MIMO) system, said MIMO system including a transmitter and a receiver, said method comprising:

receiving an acknowledgement (ACK) signal or at least one negative acknowledgement (NACK) signal from the receiver via an adaptive retransmission component located at the transmitter to determine whether a transmission antenna of a plurality of transmission antennas has transmitted data incorrectly;

concluding that a data section transmitted by the transmission antenna is properly received at the receiver and no retransmission is required if said ACK signal is received; or concluding that said data section transmitted by the transmission antenna is not properly received at the receiver if said at least one NACK signal is received, and retransmitting at least an error data section in an error frame with duplicated retransmission by all or other transmission antennas of said plurality of transmission antennas;

wherein if one NACK signal is received, said at least an error data section in said error frame is retransmitted with duplicated retransmission by all of said plurality of transmission antennas according to the following method:

retransmitting any one of error symbols in said error frame using all of said plurality of transmission antennas when the number of said error symbols in said error frame is a constant integer;

using all of said plurality transmission antennas uniformly for duplicated retransmission when a ratio of the number of said error symbols in said error frame to the number of said plurality of transmission antennas is less than or equal to a threshold; and using one of said plurality of transmission antennas to retransmit one of said error symbols respectively, and selecting one or more of said error symbols for duplicated retransmission on remaining transmission antennas when the ratio of the number of said error symbols in said error frame to the number of said plurality of transmission antennas is greater than said threshold.

16. The method as claimed in claim 14, wherein said individual error detecting code is a cyclic redundancy check code.

17. The method as claimed in claim 12, wherein said method further refers to a signal-to-noise ratio of error data, a channel fading condition and said distribution order of spatial signal strength in the feedback information, or any combination of the above to determine said at least a retransmission signal vector for error data.

18. The method as claimed in claim 12, wherein said distribution order of spatial signal strength for said plurality of transmission antennas is an order index value of ordering successive interference cancellation.

19. The method as claimed in claim 15, wherein said constant integer is 1.

20. The method as claimed in claim 15, wherein said threshold is ½.

* * * * *